United States Patent
Li et al.

(10) Patent No.: US 11,947,047 B2
(45) Date of Patent: Apr. 2, 2024

(54) METHOD AND SYSTEM FOR ENCODING AND DECODING LIDAR

(71) Applicant: Innovusion Ireland Limited, Los Altos, CA (US)

(72) Inventors: Yimin Li, Los Altos, CA (US); Junwei Bao, Los Altos, CA (US); Rui Zhang, Los Altos, CA (US)

(73) Assignee: Seyond, Inc., Sunnyvale, CA (US)

( * ) Notice: Subject to any disclaimer, the term of this patent is extended or adjusted under 35 U.S.C. 154(b) by 176 days.

(21) Appl. No.: 17/210,173

(22) Filed: Mar. 23, 2021

(65) Prior Publication Data

US 2021/0231784 A1 Jul. 29, 2021

Related U.S. Application Data

(63) Continuation of application No. 15/863,695, filed on Jan. 5, 2018, now Pat. No. 10,969,475.

(Continued)

(51) Int. Cl.
*G01S 7/4865* (2020.01)
*G01S 7/484* (2006.01)
(Continued)

(52) U.S. Cl.
CPC ............ *G01S 7/4865* (2013.01); *G01S 7/484* (2013.01); *G01S 17/10* (2013.01); *G01S 7/4876* (2013.01)

(58) Field of Classification Search
None
See application file for complete search history.

(56) References Cited

U.S. PATENT DOCUMENTS

| 3,897,150 A | 7/1975 | Bridges et al. |
| 4,464,048 A | 8/1984 | Farlow |

(Continued)

FOREIGN PATENT DOCUMENTS

| CN | 1677050 A | 10/2005 |
| CN | 103116164 A | 5/2013 |

(Continued)

OTHER PUBLICATIONS

Office Action issued in Chinese Application No. 201880015869.X dated Oct. 10, 2022, 18 pages.

(Continued)

*Primary Examiner* — Luke D Ratcliffe
(74) *Attorney, Agent, or Firm* — MASCHOFF BRENNAN; Elaine K. Lee; Liang Huang

(57) ABSTRACT

The present disclosure describes a system and method for encoding pulses of light for LiDAR scanning. The system includes a sequence generator, a light source, a modulator, a light detector, a correlator, and a microprocessor. The sequence generator generates a sequence code that the modulator encodes into a pulse of light from the light source. The encoded pulse of light illuminates a surface of an object, in which scattered light from the encoded light pulse is detected. The correlator correlates the scattered light with the sequence code that outputs a peak value associated with a time that the pulse of light is received. The microprocessor is configured to determine a time difference between transmission and reception of the pulse of light based on whether the amplitude of the peak exceeds the threshold value. The microprocessor calculates a distance to the surface of the object based on the time difference.

20 Claims, 8 Drawing Sheets

Related U.S. Application Data

(60) Provisional application No. 62/442,758, filed on Jan. 5, 2017.

(51) Int. Cl.
*G01S 7/487* (2006.01)
*G01S 17/10* (2020.01)

(56) References Cited

U.S. PATENT DOCUMENTS

| | | |
|---|---|---|
| 5,006,721 A | 4/1991 | Cameron et al. |
| 5,157,451 A | 10/1992 | Taboada et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Brochers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |

(56) References Cited

U.S. PATENT DOCUMENTS

| | | |
|---|---|---|
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1* | 1/2016 | Gilliland ............... G01S 17/894 356/5.01 |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | | |
|---|---|---|---|
| CN | 204758260 U | 11/2015 | |
| CN | 204885804 U | 12/2015 | |
| CN | 105911559 A | 8/2016 | |
| CN | 105954732 A | 9/2016 | |
| CN | 106199562 A | 12/2016 | |
| CN | 108132472 A | 6/2018 | |
| CN | 207457508 U | 6/2018 | |
| CN | 207557465 U | 6/2018 | |
| CN | 208314210 U | 1/2019 | |
| CN | 208421228 U | 1/2019 | |
| CN | 208705506 U | 4/2019 | |
| CN | 106597471 B | 5/2019 | |
| CN | 209280923 U | 8/2019 | |
| CN | 108445468 B | 11/2019 | |
| CN | 110031823 B | 3/2020 | |
| CN | 108089201 B | 4/2020 | |
| CN | 109116331 B | 4/2020 | |
| CN | 109917408 8 | 4/2020 | |
| CN | 109116366 B | 5/2020 | |
| CN | 109116367 B | 5/2020 | |
| CN | 110031822 B | 5/2020 | |
| CN | 211655309 U | 10/2020 | |
| CN | 109188397 B | 11/2020 | |
| CN | 109814086 B | 11/2020 | |
| CN | 109917348 B | 11/2020 | |
| CN | 110492856 B | 11/2020 | |
| CN | 110736975 B | 11/2020 | |
| CN | 109725320 B | 12/2020 | |
| CN | 110780284 B | 12/2020 | |
| CN | 110780283 B | 1/2021 | |
| CN | 110784220 B | 2/2021 | |
| CN | 212623082 U | 2/2021 | |
| CN | 110492349 B | 3/2021 | |
| CN | 109950784 B | 5/2021 | |
| CN | 213182011 U | 5/2021 | |
| CN | 213750313 U | 7/2021 | |
| CN | 214151038 U | 9/2021 | |
| CN | 109814082 B | 10/2021 | |
| CN | 113491043 A | 10/2021 | |
| CN | 214795200 U | 11/2021 | |
| CN | 214795206 U | 11/2021 | |
| CN | 214895784 U | 11/2021 | |
| CN | 214895810 U | 11/2021 | |
| CN | 215641806 U | 1/2022 | |
| CN | 112639527 B | 2/2022 | |
| CN | 215932142 U | 3/2022 | |
| CN | 112578396 B | 4/2022 | |
| EP | 1085346 B1 * | 3/2002 | ............. G01S 17/95 |
| EP | 0 757 257 A2 | 5/2002 | |
| EP | 1 237 305 A2 | 9/2002 | |
| EP | 1 923 721 A1 | 5/2008 | |
| EP | 2 157 445 A2 | 2/2010 | |
| EP | 2 395 368 A1 | 12/2011 | |
| EP | 2 889 642 A1 | 7/2015 | |
| GB | 1 427 164 A | 3/1976 | |
| GB | 2000411 | 1/1979 | |
| JP | 2000137076 A | 5/2000 | |
| JP | 2003-167281 A | 6/2003 | |
| JP | 2006-322759 A | 11/2006 | |
| JP | 2006308482 A | 11/2006 | |
| JP | 2007144667 A | 6/2007 | |
| JP | 2008-107286 A | 5/2008 | |
| JP | 2009-156666 A | 7/2009 | |
| JP | 2010-45965 A | 2/2010 | |
| JP | 2010035385 A | 2/2010 | |
| JP | 2016014665 A | 1/2016 | |
| JP | 2016-206610 A | 12/2016 | |
| JP | 2017-003347 A | 1/2017 | |
| JP | 2017-138301 A | 8/2017 | |
| KR | 10-2012-0013515 A | 2/2012 | |
| KR | 10-2013-0068224 A | 6/2013 | |
| KR | 10-2018-0107673 A | 10/2018 | |
| WO | 2017/110417 A1 | 6/2017 | |

(56) References Cited

FOREIGN PATENT DOCUMENTS

| WO | 2018/125725 | A1 | 7/2018 |
|---|---|---|---|
| WO | 2018/129410 | A1 | 7/2018 |
| WO | 2018129408 | A1 | 7/2018 |
| WO | 2018129409 | A1 | 7/2018 |
| WO | 2018129410 | A1 | 7/2018 |
| WO | 2018175990 | | 9/2018 |
| WO | 2018182812 | A2 | 10/2018 |
| WO | 2019079642 | | 4/2019 |
| WO | 2019165095 | | 8/2019 |
| WO | 2019165289 | A1 | 8/2019 |
| WO | 2019165294 | | 8/2019 |
| WO | 2020013890 | A2 | 1/2020 |

OTHER PUBLICATIONS

Office Action issued in Japanese Patent Application No. 2019-536968 dated Nov. 9, 2021, 7 pages.
Office Action issued in European Application No. 18 736 738.8 dated Jul. 5, 2022, 6 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
Office Action issued in Chinese Application No. 201880015869.X dated Apr. 12, 2023, 17 pages.
Office Action issued in Korean Patent Application No. 10-2019-7022584 dated Dec. 14, 2022, 20 pages.
Notice of Allowance issued in Korean Patent Application No. 10-2018-7022584 dated Jun. 21, 2023, 10 pages.
Office Action Issued in Japanese Patent Application No. 2022-179273 dated Oct. 24, 2023, 9 pages.
Office Action issued in European Application No. 18736738.8 dated Nov. 9, 2023, 6 pages.

* cited by examiner

METHOD AND SYSTEM FOR ENCODING AND DECODING LIDAR

CROSS-REFERENCE TO RELATED APPLICATIONS

This application is a Continuation Application of U.S. patent application Ser. No. 15/863,695, entitled "METHOD AND SYSTEM FOR ENCODING AND DECODING LiDAR", filed Jan. 5, 2018, now U.S. Pat. No. 10,969,475, which claims priority to U.S. Provisional Patent Application No. 62/442,758, entitled "METHOD AND SYSTEM FOR ENCODING AND DECODING LiDAR", filed on Jan. 5, 2017, the content of each of which is hereby incorporated by reference in its entirety.

FIELD OF THE DISCLOSURE

The present disclosure generally relates to a light detection and ranging (LiDAR) and, more specifically, to a technique for encoding and decoding a LiDAR system.

BACKGROUND OF THE DISCLOSURE

LiDAR system can be used to measure the distance between an object and the system. Specifically, the system can transmit a signal (e.g., using a light source), record a returned signal (e.g., using light detectors), and determine the distance by calculating the delay between the returned signal and the transmitted signal.

SUMMARY OF THE DISCLOSURE

The following presents a simplified summary of one or more examples in order to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a light detection and ranging (LiDAR) scanning system, comprising: a light source, wherein the light source is configured to transmit a pulse of light to illuminate a surface of an object; a modulator operable to encode the pulse of light in response to a signal from a sequence generator; a light detector configured to detect scattered light from the surface of the object of the light pulse; a correlator electrically coupled to the light detector, wherein the correlator is configured to correlate the scattered light with the sequence code and output a peak value associated with a time that the pulse of light is received, and a microprocessor electrically coupled to the light source and the correlator, wherein the microprocessor is configured to: determine whether an amplitude of the peak value exceeds a threshold value; in accordance with a determination that the amplitude of the peak exceeds the threshold value: determine a time difference between a time that pulse of light was transmitted and the time that the pulse of light is received; and calculate a distance to the surface of the object based on the time difference.

In accordance with some embodiments, a method for light detection and ranging (LiDAR) scanning detection, the method comprising: encoding a pulse of light from a light source with a sequence code; transmitting the pulse of light to illuminate a surface of an object; detecting, at a detector, scattered light from the illuminated surface of the object; correlating the detected scattered light with the sequence code that outputs a peak value associated with a time that the pulse of light is received; determining whether an amplitude of the peak value exceeds a threshold value; in accordance with a determination that the amplitude of the peak value exceeds the threshold value: determining a time difference between a time that pulse of light was transmitted and the time the pulse of light is received; and calculating a distance to the surface of the object based on the time difference.

In accordance with some embodiments, a computer-implemented method comprises: in a light detection and ranging (LiDAR) system having a light source and a light detector: transmitting, using the light source, a first pulse group signal having a first number of pulse signals and a second pulse group signal having a second number of pulse signals, wherein the first number is different from the second number; receiving, using the light detector, a returned pulse group signal having a third number of pulse signals; determining, based on the third number of pulse signals, whether the returned pulse group signal corresponds to the first pulse group signal or the second pulse group signal; in accordance with a determination that the returned pulse group signal corresponds to the first pulse group signal, determining a first distance based on the returned pulse group signal and the transmitted first pulse group signal; and in accordance with a determination that the returned pulse group signal corresponds to the second pulse group signal, determining a second distance based on the returned pulse group signal and the transmitted second pulse group signal.

In accordance with some embodiments, a light detection and ranging (LiDAR) scanning system comprises a light source, wherein the light source is configured to transmit a first pulse group signal having a first number of pulse signals and a second pulse group signal having a second number of pulse signals, wherein the first number is different from the second number; a light detector configured to detect a returned pulse group signal having a third number of pulse signals; a microprocessor electrically coupled to the light source and the light detector, wherein the microprocessor is configured to determine, based on the third number of pulse signals, whether the returned pulse group signal corresponds to the first pulse group signal or the second pulse group signal; in accordance with a determination that the returned pulse group signal corresponds to the first pulse group signal, determine a first distance based on the returned pulse group signal and the transmitted first pulse group signal; and in accordance with a determination that the returned pulse group signal corresponds to the second pulse group signal, determine a second distance based on the returned pulse group signal and the transmitted second pulse group signal.

BRIEF DESCRIPTION OF THE DRAWINGS

For a better understanding of the various described aspects, reference should be made to the description below, in conjunction with the following figures in which like-referenced numerals refer to corresponding parts throughout the figures.

DETAILED DESCRIPTION

Figure 1:
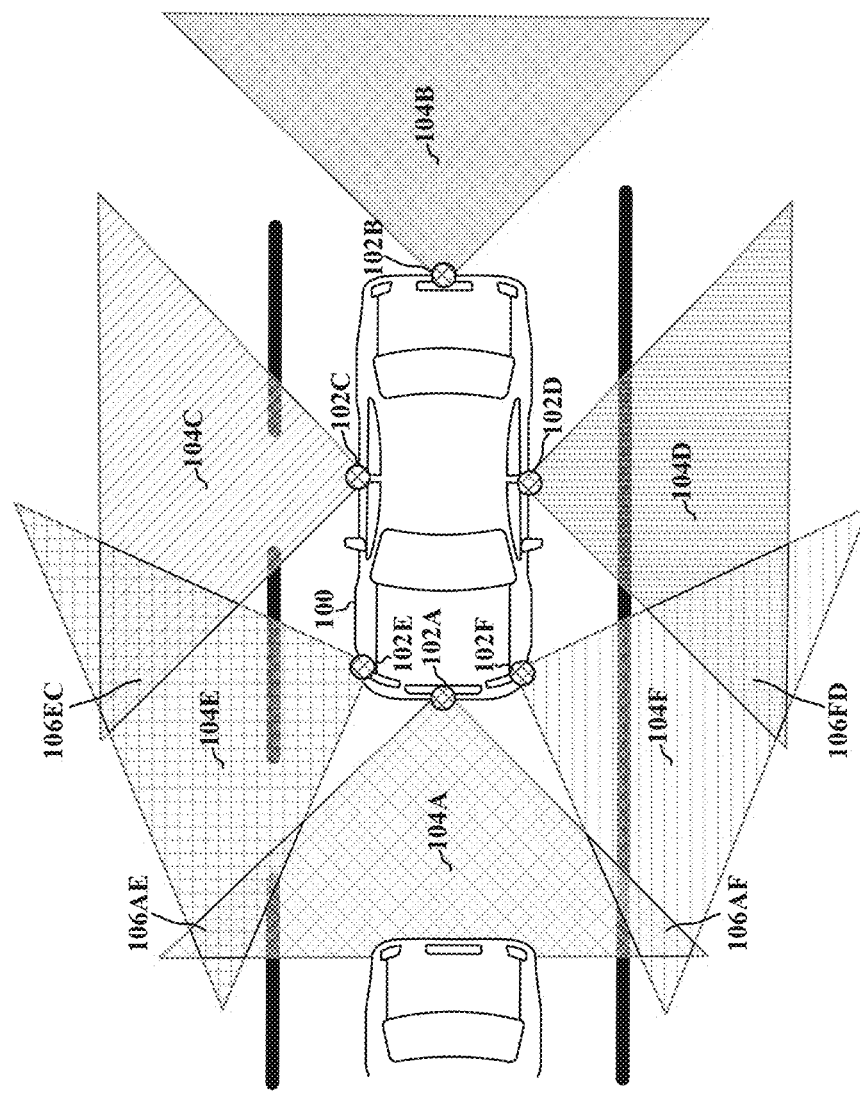
FIG. 1 illustrates a plurality of LiDAR systems attached to a vehicle.

To determine the range of an object, a LiDAR system illuminates an object with a pulse of light and detects the scattered light that corresponds to the pulse of light. Associating a pulse of light with scattered light that does not correspond to the pulse of light may cause the LiDAR system to interpret the presence of an object, even though there is no physical object there. For example, scattered light from another pulse transmitted by the same LiDAR system or by a second LiDAR system in proximity to the LiDAR system can mistakenly be paired with the original pulse light, which can be incorrectly interpreted as an object. Current techniques typically post-process samples to correct for "false" objects by comparing adjacent samples of a capture frame, which is at best an approximation. As such, the challenge is to improve on pairing a pulse of light with the corresponding scattered light from the light pulse.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Examples of LiDAR systems and processes will now be presented with reference to various elements of apparatuses and methods. These apparatuses and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Although the following description uses terms "first," "second," etc. to describe various elements, these elements should not be limited by the terms. These terms are only used to distinguish one element from another. For example, a first pulse signal could be termed a second pulse signal, and, similarly, a second pulse signal could be termed a first pulse signal, without departing from the scope of the various described embodiments. The first pulse signal and the second pulse signals are both pulse signals, but they may not be the same pulse signal.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates a plurality of LiDAR systems 102A-102F attached to a vehicle 100. As depicted in FIG. 1, the vehicle 100 has a first LiDAR system 102A directed to scan the front region 104A of the vehicle 100, a second LiDAR system 102B directed to scan the rear region 104B of the vehicle 100, a third LiDAR system 102C directed to scan passenger side region 104C of the vehicle 100, a fourth LiDAR system 102B directed to scan the driver side region 104D of the vehicle 100, a fifth LiDAR system 102E directed to scan the front passenger side corner region 104E of the vehicle 100, and a sixth LiDAR system 102F directed to scan the front driver side corner region 104F of the vehicle 100.

In this example, the fifth LiDAR system 102E of the vehicle 100 covers a "blind spot" (e.g., an area not scanned by a LiDAR system) corresponding to the non-scanned area between the front region 104A and the passenger side region 104C. As such, the fifth LiDAR system 102E has a front passenger side corner region 104E that overlaps with the front region 104A at a first overlapping region 106AE and a front passenger side corner region 104E that overlaps with the passenger side region 104C at a second overlapping region 106EC. Likewise, the sixth LiDAR system 102F of the vehicle 100 covers a "blind spot" (e.g., an area not scanned by a LiDAR system) corresponding to the non-scanned area between the front region 104A and the driver side region 104D. As such, the sixth LiDAR system 102F has a front driver side corner region 104F that overlaps with the front region 104A at a third overlapping region 106AF and a front driver side corner region 104F that overlaps with the driver side region 104D at a fourth overlapping region 106FD.

The overlapping regions can provide additional resolution since each overlapping region can range objects within each respective overlapping region from more than one LiDAR system. For example, the first LiDAR system 102A can range a surface of an object situated in the first overlapping region 106AE and the fifth LiDAR system 102E can range an adjacent surface of an object situated in the first overlapping region 106AE. As such, the first overlapping region 106AE can be over-scanned where two LiDAR systems can range objects in the same area at the same time.

Over-scanning overlapping regions (e.g., the first overlapping region 106AE, the second overlapping region 106EC, the third overlapping region 106AF, the fourth overlapping region 106FD, etc.) can also cause interference between one or more LiDAR systems. For example, the first LiDAR system 102A can range a surface of an object situated in the first overlapping region 106AE at substantially the same time and in substantially the same location that the fifth LiDAR system 102E ranges a surface of an object situated in the first overlapping region 106AE. In such an instance, a pulse of scattered light from the first LiDAR system 102A can mistakenly be detected at the fifth LiDAR system 102E. Likewise, a pulse of scattered light from the fifth LiDAR system 102E can mistakenly be detected at the first LiDAR system 102A.

In some instances, a pulse of scattered light from the first LiDAR system 102A can interfere with a pulse of scattered light from the fifth LiDAR system 102E. That is, the first LiDAR system 102A can detect both the pulses of scattered light and it can be difficult to distinguish which is the pulse of scattered light that corresponds to the pulse of light transmitted from the first LiDAR system 102A. One approach to distinguish which pulse of scattered light corresponds to the transmitted pulse of light when multiple pulses of scattered light are detected is to implement a "first to arrive" distinction, which associates the first detected scattered light to a transmitted pulse of light. The reasoning in this approach is that the first pulse of light to arrive travels the shortest distance, which corresponds to the correct transmitted pulse of light. However, pulses of scattered light from adjacent LiDAR systems can interfere with this approach. For instance, a pulse of scattered light from the fifth LiDAR system 102E can arrive at the first LiDAR system 102A prior to a pulse of scattered light transmitted from the first LiDAR system 102A. As such, selecting the "first to arrive" (e.g., in this instance, a pulse of scattered light from the fifth LiDAR system 102E) approach yields a range for an object that is closer than it really is.

Another approach to distinguish which pulse of scattered light corresponds to the transmitted pulse of light when multiple pulses of scattered light are detected is to implement a "most intense" distinction, which associates the brightest detected pulse of scattered light to a transmitted pulse of light. The reasoning in this approach is that the alignment of the light source and the detector collects a more intense pulse of light than a second light source that is randomly aligned with the detector. As such, the most intense (e.g., brightest) pulse of light to arrive corresponds to the transmitted pulse of light. For instance, the pulse of scattered light originating from the fifth LiDAR system 102E can arrive at the first LiDAR system 102A after and with a higher intensity than a pulse of scattered light originating from the first LiDAR system 102A. In such an instance, selecting the "most intense" (e.g., in this instance, a pulse of scattered light from the fifth LiDAR system 102E) approach yields a range for an object that is farther away than it really is.

To accurately distinguish which pulse of scattered light corresponds to the transmitted pulse of light when multiple pulses of light are detected, each LiDAR system depicted in FIG. 1 (e.g., 102A-102F) includes a modulator operable to encode the transmitted pulse of light in response to a signal from a sequence generator. That is, each transmitted pulse of light is modulated according to a sequence code, which is represented in FIG. 1 as the pattern for each scanning region (e.g., regions 104A-104F). In some examples, the sequence code is a pseudorandom bit sequence (PRBS) code. For instance, the PRBS code can have $2^5-1$ bits corresponding to a PRBS-5 code, PRBS code can have $2^{31}-1$ bits corresponding to a PRBS-31 code, etc. It should be appreciated that the PRBS code can be larger than $2^5-1$. For instance, the PRBS code can have $2^6-1$ bits corresponding to a PRBS-6 code, the PRBS code can have $2^7-1$ bits corresponding to a PRBS-7 code, the PRBS code can have $2^8-1$ bits corresponding to a PRBS-8 code, the PRBS code can have $2^9-1$ bits corresponding to a PRBS-9 code, etc. It should also be appreciated that the PRBS code can be smaller than $2^5-1$. For instance, the PRBS code can have $2^4-1$ bits corresponding to a PRBS-4 code, the PRBS code can have $2^3-1$ bits corresponding to a PRBS-3 code, etc.

As depicted in patterns regions (e.g., 104A-104F) of FIG. 1, each LiDAR system encodes the transmitted pulse of light, which facilitates distinguishing the pulse of scattered light that corresponds to the transmitted pulse of light when multiple pulses of scattered light are detected. For example, the pulse of scattered light originating from the fifth LiDAR system 102E can arrive at the first LiDAR system 102A prior to pulse of scattered light transmitted from the first LiDAR system 102A. The pulse of scattered light originating from the pulse of scattered light originating from the first LiDAR system 102A and the fifth LiDAR system 102E are correlated with the sequence code of the first LiDAR system 102A. Because the correlation between the pulse of scattered light originating from the first LiDAR system 102A and the sequence code of the first LiDAR system 102A is higher than the correlation between the pulse of scattered light originating from the fifth LiDAR system 102E and the sequence code of the first LiDAR system 102A, the first LiDAR system 102A correctly identifies the pulse of scattered light arriving later (e.g., the pulse of scattered light originating from the first LiDAR system 102A).

In another example, a pulse of scattered light originating from the fifth LiDAR system 102E can arrive at the first LiDAR system 102A after with a higher intensity than a pulse of scattered light originating from the first LiDAR system 102A. The pulse of scattered light originating from the first LiDAR system 102A and the pulse of scattered light originating from the fifth LiDAR system 102E are correlated with the sequence code of the first LiDAR system 102A. Because the correlation between the pulse of scattered light originating from the first LiDAR system 102A and the sequence code of the first LiDAR system 102A is higher than the correlation between the pulse of scattered light originating from the fifth LiDAR system 102E and the sequence code of the first LiDAR system 102A, the first LiDAR system 102A correctly identifies the pulse of scattered light with the lower intensity (e.g., the pulse of scattered light originating from the first LiDAR system 102A).

Figure 2:
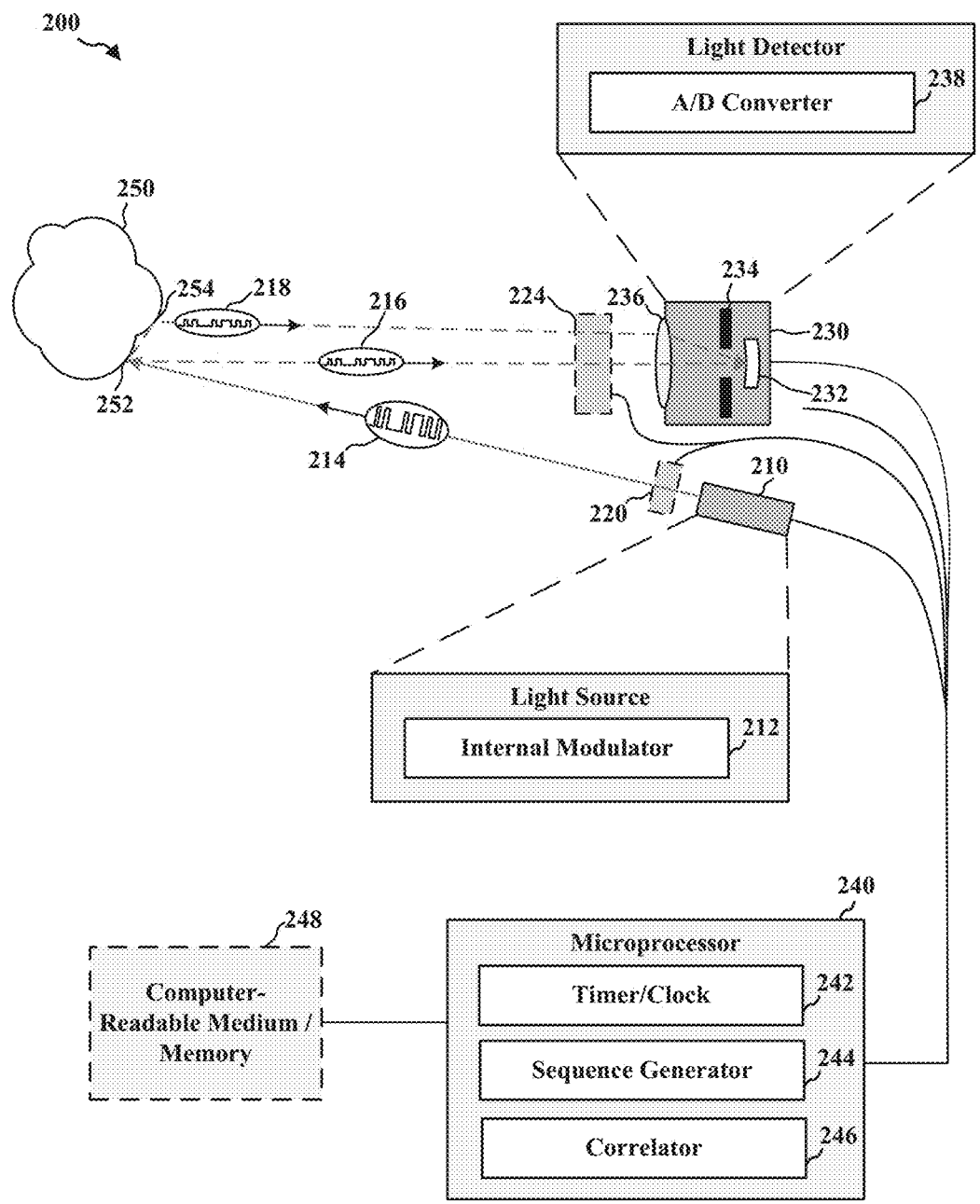
FIG. 2 illustrates an exemplary LiDAR system for distinguishing delayed pulses of light.

FIG. 2 illustrates an exemplary LiDAR system 200 for distinguishing delayed pulses of light. The LiDAR system 200 includes a light source 210, a light detector 230, and an electrical processing and computing device (such as a microcontroller) 240. As depicted in FIG. 2, the light source 210 is configured to transmit a pulse of light 214 that illuminates a first surface 252 of an object 250. In the examples described herein, the light source 210 is a laser diode. In some examples, the light source 210 can be incandescent light, fluorescent light, and the like. Further, the light source 210 can have one or more wavelengths that in the visible spectrum, one or more wavelengths in the infrared spectrum, or one or more wavelengths in the ultra violet spectrum.

In the example depicted in FIG. 2, the light source 210 has an internal modulator 212 that is operable to encode the pulse of light 214 in response to a signal from a sequence generator 244. In some instances, the internal modulator 212 is configured to modulate an injection current to the laser diode light source 210 in accordance with on-off keying. Instead of using an internal modulator 212, the modulator can be external the light source. For example, the modulator can be an opto-electrical modulator 220 situated in the optical path of the light source 210 and the object 250, as depicted as an option in FIG. 2. In some examples, the opto-electrical modulator 220 can be a Mach-Zehnder modulator.

As depicted in FIG. 2, the light detector 230 is in the optical path of the pulse of scattered light 216. The light detector 230 is configured to detect a pulse of scattered light 216 diffused or scattered from the first surface 252 of the object 250 originating from the light pulse 214. The light detector 230 can include a photo sensor 232, an aperture mask 234, and converging lens 236. The converging lens 236 is configured to direct a pulse scattered light toward a focal region at the photo sensor 232. The converging lens 236 can be made from any transparent material such as high index glass, plastic, and the like. The lens 236 directs pulses of scattered light 216 over a large area, which increases the amount of pulses of scattered light 216 collected at the photo sensor 232. The mask 234 is configured to filter pulses of scattered light 216 near the photo sensor 232 that are obliquely angled with respect to the optical path of a direct pulse of scattered light 216, so that only light that is substantially parallel to the path of a direct pulse of scattered light 216 can reach the photo sensor 232.

In some instances, light from the pulse of light 214 can disperse from a first surface 252 and "echo" off a second surface 254 and be directed along an optical path that is substantially parallel to the path of a direct pulse of scattered light 216. However, the extra distance that such pulse of echo-scattered light 218 takes delays the pulse of echo-scattered light 218 from the more direct path of the pulse of scattered light 216. As such, echo-scattered light 218 lag a direct pulse of scattered light 216. The photo sensor 232 can be a photodiode, an avalanche photodiode, a photo-multiplier tube, and the like. In some examples, the photo sensor 232 includes a reflective mirror facing the opposite surface of the light incident surface, which reflects light back to the absorption region of the photo sensor 232.

It should be appreciated that the LiDAR system 200 detects both the pulse of scattered light 216 and the echo-scattered light 218 and the LiDAR system 200 associates both the pulse of scattered light 216 and the echo-scattered light 218 as valid pulses transmitted by the LiDAR system 200. In some examples, the LiDAR system 200 associates both the pulses of scattered light 216 and the echo-scattered light 218 as valid pulses transmitted by the LiDAR system 200 based on the sequence code encoded in the pulses in accordance with the methods described herein. In instances where there are one or more valid pulses, the LiDAR system 200 attributes the "first to arrive" as the pulse of scattered light 214 and the remaining as pulses of echo-scattered light 218 as echo-scattered light 218 lag a direct pulse of scattered light 216.

In the examples depicted in FIG. 2, the light detector 230 includes an analog to digital (A/D) converter 238. The A/D converter 238 can be an integrated circuit that is configured to convert the analog electrical response from the detector (e.g., photo sensor 232) to absorbed scattered light 216 to a digital electrical signal. Moreover, having the A/D converter 238 substantially at the photo sensor 232 can reduces losses (e.g., line loss), which can increase the signal integrity.

The example depicted in FIG. 2 includes an electrical processing and computing device (such as a microprocessor) 240 that is electrically coupled to a computer-readable medium/memory 248, the light source 210, the light detector 230, photo sensor 232, the optional optical modulator 224, and the optional opto-electrical modulator 220. The microprocessor 240 in the LiDAR system 200 can execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise The microprocessor 240 includes a time/clock 242, a sequence generator 244, and a correlator 246. As depicted in FIG. 2, the microprocessor 240 is electrically coupled to the light source 210 and the correlator 246. As such, the light source 210 can trigger the timer/clock 242 to mark the time for a pulse of light 214 is transmitted. Likewise the correlator 246 can mark the time for pulse of light detected. In some examples, the timer/clock module 242 is configured to mark each pulse of light 214 that is transmitted or received with a timestamp. The timestamp is an encoded date and time. Examples of time timestamps include "month-day-year@hour:min:sec," "month-day-year@hour:min:sec," "year-dd-month@hour:min:sec," "1234567890 (Unix time)," etc. The timer/clock module 308 can further pair a pulse of light 214 with a scattered pulse of light 216 and determine the time difference. In some examples, the time/clock 242 is a module embedded within the microprocessor 240.

The sequence generator 244 is configured to generate a sequence code. The sequence generator 244 is electrically coupled to the correlator 246, the light source 210 (e.g., internal modulator 212), and optionally to the opto-electrical modulator 220. In some examples, the sequence generator 244 is a module embedded within the microprocessor 240. In some examples, the sequence code is a pseudorandom bit sequence (PRBS) code.

The correlator 246 is electrically coupled to the light detector 230. The correlator 246 is configured to correlate a pulse of scattered light 216 with a sequence code, which measures the similarity between the pulse of scattered light 216 and the sequence code. For a high similarity, the correlator 246 outputs a peak value where the pulse of scattered light 216 and the sequence code align. The position of the peak value is associated with a time that the pulse of scattered light 216 is received. For correlation in the electrical domain, the correlator 246 accesses the digital electrical signal from the A/D converter 238, which corresponds to the electrical representation of the scattered light 216. As depicted in FIG. 2, the A/D converter 238 is electrically coupled to the light detector 230.

Instead of the correlator 246, which correlates a pulse of scattered light 216 in the electrical domain as depicted in FIG. 2, the LiDAR system 200 can include an optical modulator 224, which correlates a pulse of scattered light 216 in the optical domain. As depicted in FIG. 2, the optical modulator 224 is situated in the optical path of the scattered light 216. In this instance the pulse of scattered light 216 is optically correlated with the sequence code. In some instances, the optical modulator 224 is configured to implement four-wave-mixing.

In some examples. the microprocessor 240 is further configure to determine whether an amplitude of the peak value from the correlation between the scattered light 216 and the sequence code exceeds a threshold value. In some examples, the threshold value is at least one standard deviation above an average of the output from the correlator 246. In accordance with a determination that the amplitude of the peak exceeds the threshold value the microprocessor 240 is further configure to determine a time difference between a time that pulse of light 214 was transmitted and the time that the pulse of scattered light 216 was received. Based on this time difference the microprocessor 240 is configured to calculate a distance to the surface (e.g., distance to first surface 252) of the object 250. In some examples, the microprocessor 240 is further configured to determine a reflectivity of the surface (e.g., first surface 252) of the object 250 based on the amplitude of the peak value.

As depicted in FIG. 2, the computer-readable medium/memory 248 is electrically coupled to microprocessor and provides storage for the time markers, the sequence code, timestamps, distance determinations, etc.

Figure 3:
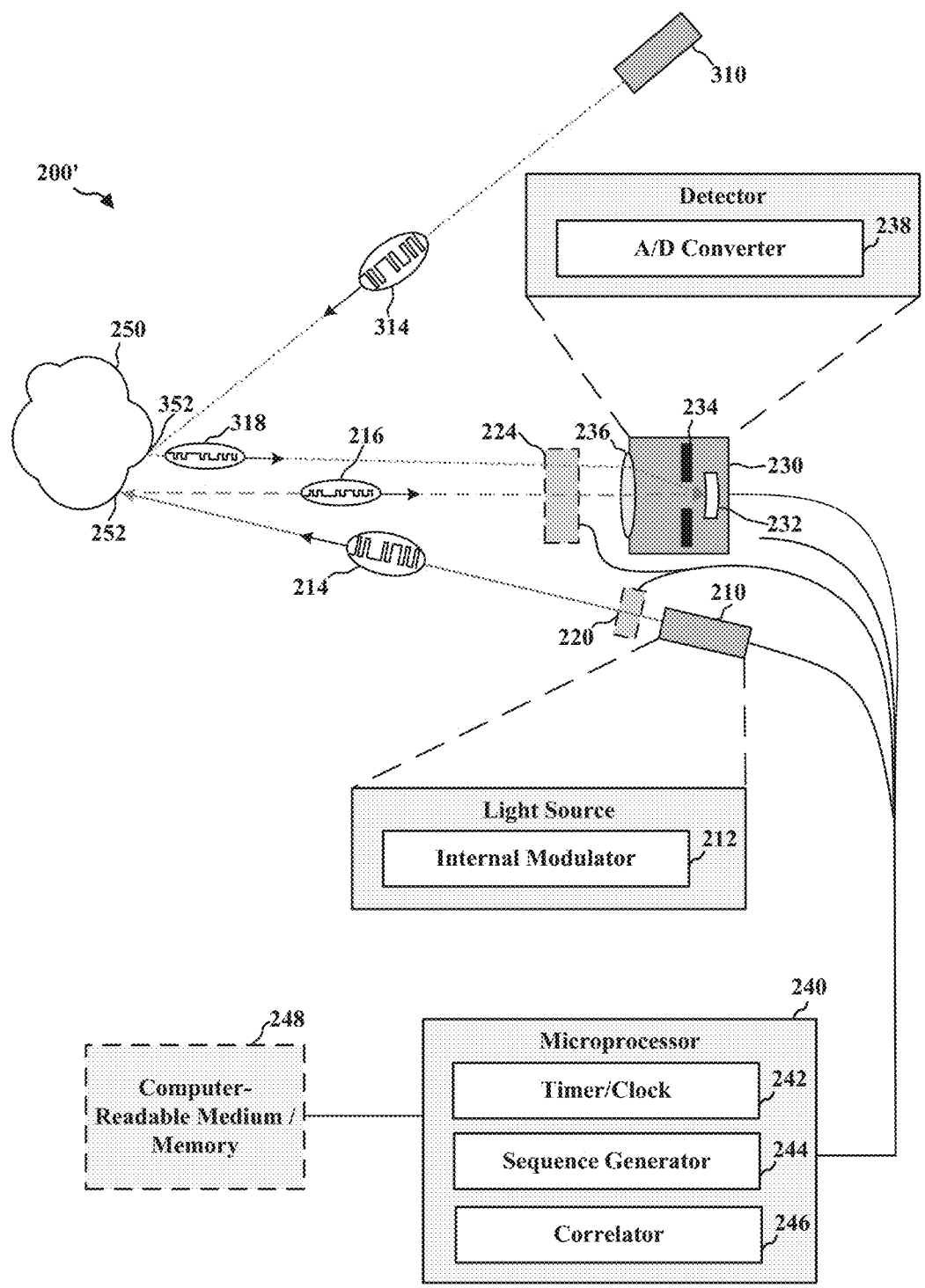
FIG. 3 illustrates an exemplary LiDAR system for distinguishing pulses of light from different light sources.

FIG. 3 illustrates an exemplary LiDAR system 200' for distinguishing pulses of light from different light sources. The LiDAR system 200' can be the LiDAR system 200 of FIG. 2 that receives a different pulse of scattered light 316 from second light source 310 instead of receiving a pulse of echo-scattered light 218. As depicted in FIG. 3, the LiDAR system 200' depicts a different pulse of light 314 from a second light source 310 that illuminates a third surface 352 of an object 250, which is in proximity to the first surface 252. Some light from the different pulse of light 314 can disperse from a third surface 352 and be directed along an optical path that is substantially parallel to the path of a direct pulse of scattered light 216 and be detected by the light detector 230.

In this example, the correlator 246 correlates the different pulse of scattered light 318 originating from the light source 310 and the code sequence and also correlates the pulse of scattered 218 originating from the light source 210 and the code sequence. The correlation results indicate that the correlation is higher for the pulse of scattered 218 compared to the correlation for the different pulse of scattered light 318. As such, the LiDAR system 200' correctly associated the different pulse of light 314 with the pulse of scattered 218.

While FIG. 3 illustrates distinguishing scattered lights originated from different light sources (i.e., light sources 210 and 310), it should be appreciated that the method of encoding pulse signals described herein can be used to distinguish among scattered lights originated from the same source. For example, a LiDAR system can encode multiple transmitted pulse signals with different sequence codes (e.g., PRBS codes) respectively. Upon receiving a scattered light, the LiDAR system can perform decoding to correlate the scattered light to a particular transmitted pulse signal that has the same encoding information. Thus, even if the scattered lights from multiple transmitted pulse signals reach the light detector in an order different from the order their corresponding pulse signals were transmitted from the LiDAR system, the system can still uniquely identify each scattered light pulse. It should be further appreciated that such method can be used in conjunction with other methods to analyze scattered lights, such as those described in U.S. Provisional Patent Application No. 62/442,912, entitled "HIGH RESOLUTION LiDAR USING HIGH FREQUENCY PULSE FIRING", filed on Jan. 5, 2017, and U.S. Non-Provisional patent application Ser. No. 15/857,563, entitled "HIGH RESOLUTION LiDAR USING HIGH FREQUENCY PULSE FIRING", filed on Dec. 28, 2017, the content of which is hereby incorporated by reference in its entirety.

Figure 4A:
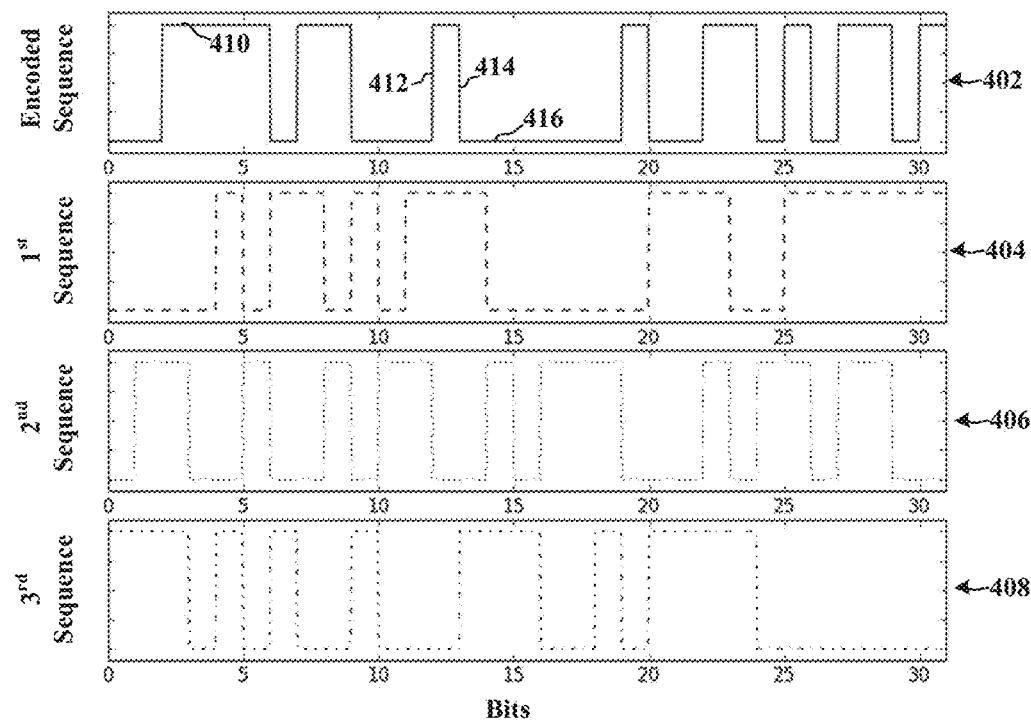
FIG. 4A illustrates four encoded sequences for encoded LiDAR systems in overlapping regions.

FIG. 4A illustrates four encoded sequences for encoded LiDAR systems. The encoded sequence 402 has a logic level "1" 410 and a logic level "0" 416 that transitions at a rising edge 412 or a falling edge 414. It should be appreciated that there is no noise on the each sequence codes (e.g., encoded sequence 402, $1^{st}$ sequence 404, $2^{nd}$ sequence 406, $3^{rd}$ sequence 408, etc.) as the sequence codes are a generated logic bit sequence and not signals. As depicted in FIG. 4A, the encoded sequence 402 is a PRBS-5 code corresponding to 31 bits (e.g., $2^5-1$).

Figure 4B:
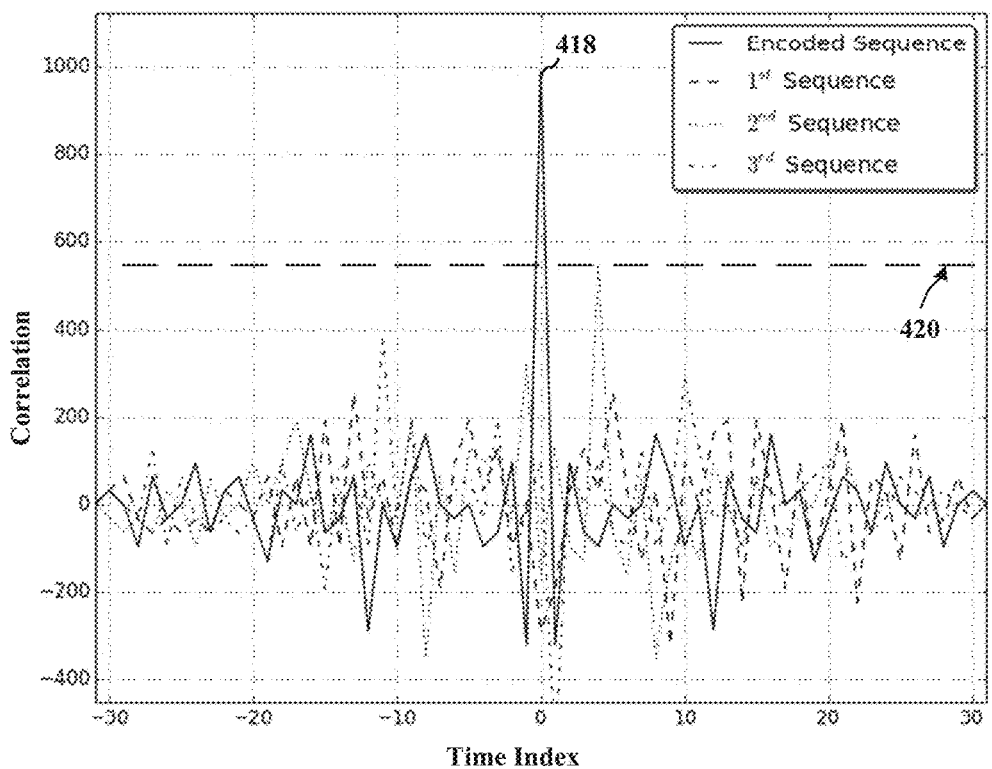
FIG. 4B illustrates correlation for distinguishing an encoded sequence between other sequences.

FIG. 4B illustrates correlation for distinguishing an encoded sequence 402 between other sequences (e.g., $1^{st}$ sequence 404, $2^{nd}$ sequence 406, $3^{rd}$ sequence 408, etc.). In this example, the correlator 246 correlates the sequence code (e.g., encoded sequence 402) with the encoded sequence 402, with $1^{st}$ sequence 404, with $2^{nd}$ sequence 406, and with $3^{rd}$ sequence 408. As depicted in FIG. 4B, the correlation between the sequence code (e.g., encoded sequence 402) and the encoded sequence 402 yields a peak value 418 that is much higher than the correlation peaks from the other sequences (e.g., $1^{st}$ sequence 404, $2^{nd}$ sequence 406, and $3^{rd}$ sequence 408). This means that if the encoded sequence 402 is the sequence code for the first LiDAR system 102A (FIG. 1) and the $1^{st}$ sequence 404 is the sequence code for the fifth LiDAR system 102E (FIG. 1), then the first LiDAR system 102A can correctly distinguish a pulse of scattered light from the first LiDAR system 102A over the fifth LiDAR system 102E within the first overlapping region 106AE.

It should be appreciated that the $2^{nd}$ sequence 406 can be the sequence code for the second LiDAR system 102B (FIG. 1), the $3^{rd}$ sequence 408 can be the sequence code for the third LiDAR system 102C (FIG. 1), and other sequence codes can be generated for the fourth LiDAR system 102D (FIG. 1) and the sixth LiDAR system 102F (FIG. 1).

FIG. 4B also depicts a threshold values 420. In some examples, the microprocessor 240 determines a threshold value 420 base on the statistics of the correlation output. For example, in some instances the threshold value 420 is at least one standard deviation above an average of the output from the correlator 246.

Figure 5A:
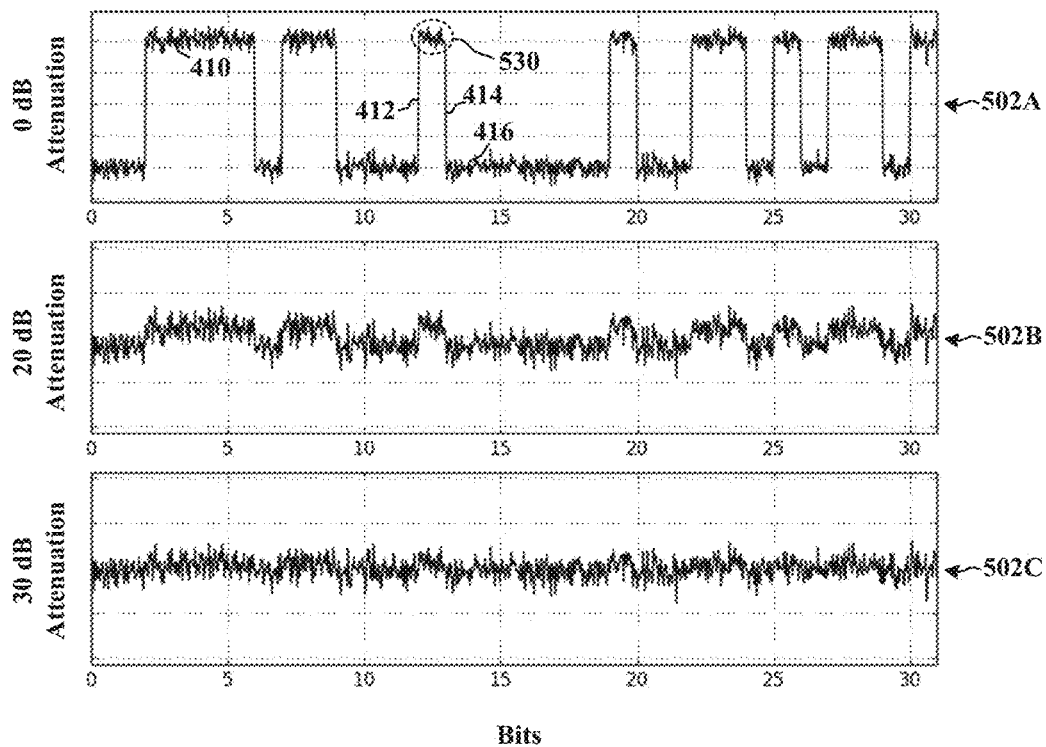
FIG. 5A illustrates an encoded signal of scattered light with noise and varied attenuation.

FIG. 5A illustrates an encoded signal of scattered light 216 with noise 530 and varied attenuation (e.g., 0 dB attenuation 502A, 20 dB attenuation 502B, 20 dB attenuation 502C). In this example, a pulse of light 214 is encoded with the encoded sequence 402. As such, the pulse of light 214 is encoded with a logic level "1" 410 and a logic level "0" 416 that transitions at a rising edge 412 or a falling edge 414. As depicted in FIG. 5A, the pulse of light 214 for 0 dB attenuation 502A is similar to the encoded sequence 402 of FIG. 4A, which does not have a noise term (e.g., noise 530). The noise 530 in the pulse of light 214 can be thermal noise (e.g., from transistors during modulation), light noise (e.g., background radiation), etc. As depicted in FIG. 5A, the pulse of light 214 at 20 dB attenuation 502B appears to be slightly visible over the noise term (e.g., noise 530), whereas the pulse of light 214 at 30 dB attenuation 502C appears to be almost indistinguishable to the naked eye over the noise term (e.g., noise 530).

Figure 5B:
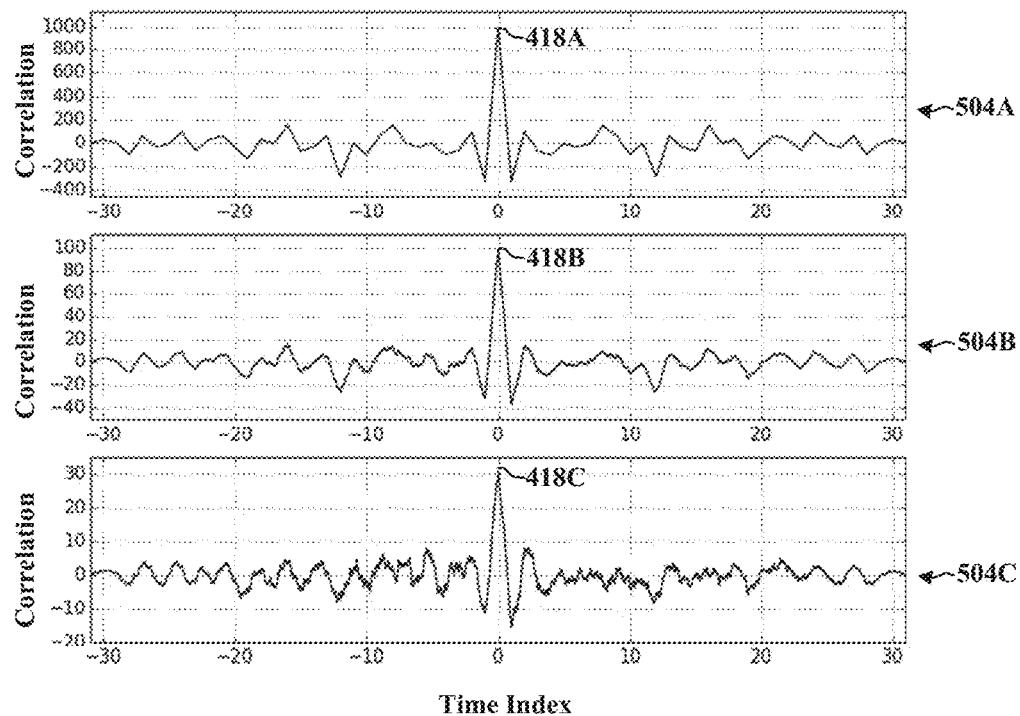
FIG. 5B illustrates correlation for the encoded signal of scattered light with noise and varied attenuation.

FIG. 5B illustrates correlation for the encoded signal of scattered light 216 with noise 530 and varied attenuation (e.g., 0 dB attenuation 502A, 20 dB attenuation 502B, 20 dB attenuation 502C). In this example, correlator 246 correlates the pulse of light 214 at 0 dB attenuation 502A, 20 dB attenuation 502B, and 30 dB attenuation 502C of FIG. 5A with the encoded sequence 402 (FIG. 4). As depicted in FIG. 5B, each of the correlation at 0 dB attenuation 504A, the correlation at 20 dB attenuation 504B, and the correlation at 30 dB attenuation 504C have a peak value 418A, a peak value 418B, and a peak value 418C, respectively. The correlation at 0 dB attenuation 504A is substantially similar to the correlation for encoded sequence 402 in FIG. 4B, whereas the correlation at 20 dB attenuation 504B has a peak value 418B looks similar but is roughly an order of magnitude smaller (e.g. 10 times smaller) than the peak value 418A of the correlation at 0 dB attenuation 504A. The correlation at 30 dB attenuation 504C has a peak value 418C that is roughly three times smaller than the peak value 418B of the correlation at 20 dB attenuation 504B.

It is noted that because the peak values 418A, 418B, 418C diminish with attenuation, it is contemplated that the microprocessor 240 can be configured to determine a reflectivity of the surface (e.g., first surface 252) of the object 250 based on the amplitude of the peak value 418.

It should be appreciated that even at 30 dB of attenuation 502C (FIG. 5A) in which to the naked eye the pulse of scattered light 216 appears to be almost indistinguishable, the correlation can still distinguish peak 418C over the noise 530 as depicted in FIG. 5B. It should also be appreciated that the location for peaks 418A, 418B, and 418C are situated at time index 0, which facilies synchronizing with time/clock 242 to determine the difference in time.

Figure 6:
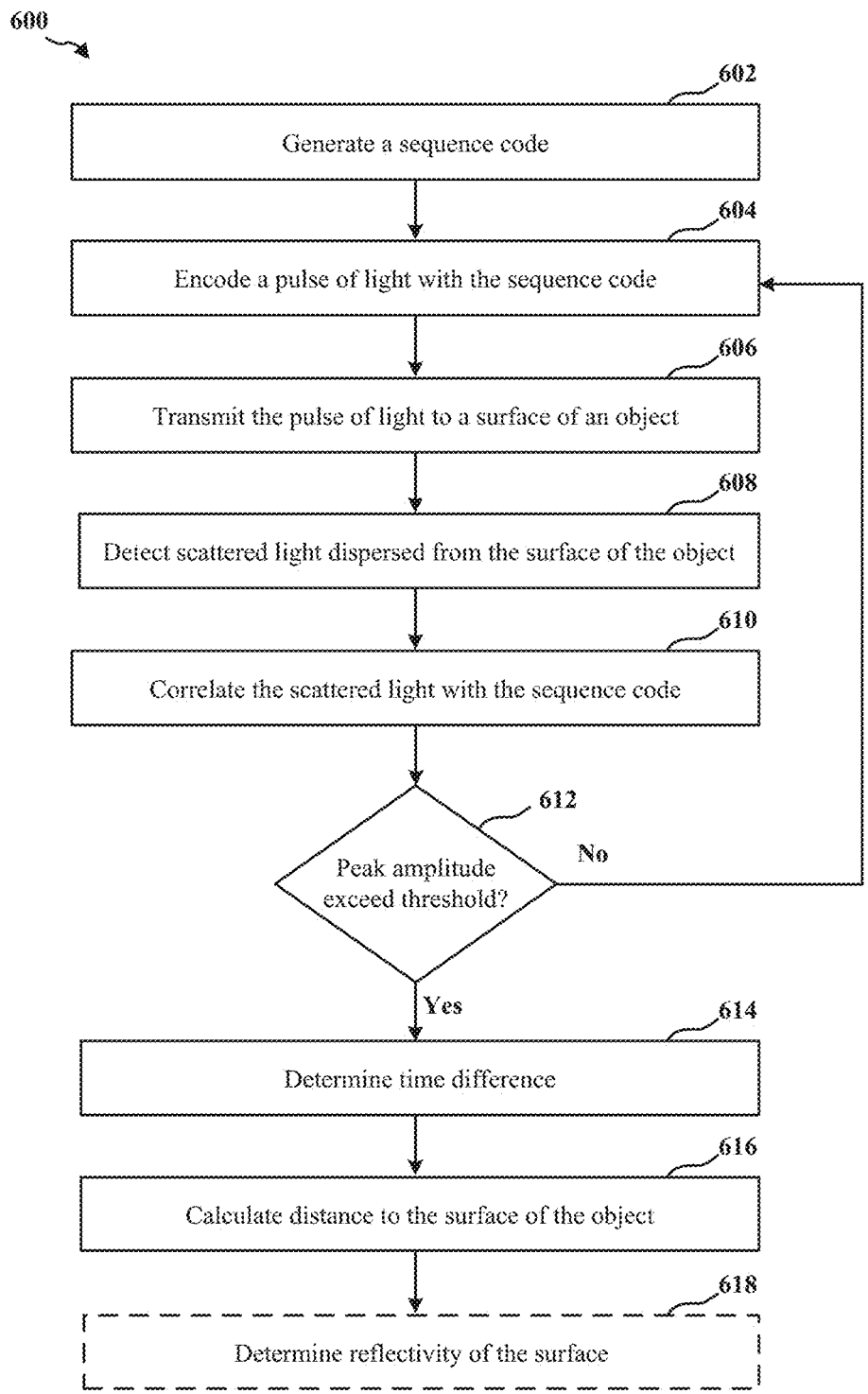
FIG. 6 illustrates an exemplary process for encoding and decoding a LiDAR system.

FIG. 6 illustrates an exemplary process 600 for encoding and decoding a LiDAR system (e.g., LiDAR system 200, LiDAR system 200', etc.). Process 600 can be performed by a system disposed or included in a vehicle. The system can be the LiDAR system 200 or 200' (FIGS. 2 and 3). At block 602, process 600 generates a sequence code. The sequence generator 244 (FIGS. 2 and 3) can be module embedded within the microprocessor 240. In some examples, the sequence code is a pseudorandom bit sequence (PRBS) code. For instance, the PRBS code can have $2^5-1$ bits corresponding to a PRBS-5 code. The sequence generator 244 provides the sequence code to the light source 210 (e.g., internal modulator 212) and the correlator 246.

At block 604, the process 600 encodes a pulse of light from a light source with a sequence code. For example, as depicted in FIGS. 2 and 3, the light source 210 is a diode laser with an internal modulator 212 that is operable to encode the pulse of light 214 in response to a signal from a sequence generator 244. In some examples, encoding a pulse of light 214 comprises modulating an injection current to the laser diode light source 210 in accordance with on/off keying. For example, the internal modulator 212 can be configured to modulate an injection current to the laser diode light source 210 in accordance with on-off keying. In some instances, the modulator is an external modulator such as the opto-electrical modulator 220 situated in the optical path of the light source 210 and the object 250. The opto-electrical modulator 220 can be a Mach-Zehnder modulator. In some examples, encoding a pulse of light 214 is modulating the pulse of light 214 via a Mach-Zehnder modulator situated in the optical path of the light source 210. In some examples, encoding a pulse of light 214 includes modulating the pulse of light 214 in optical domain via an electro-optical modulator.

At block 606, the process 600 transmits the pulse of light to illuminate a surface of an object. That is, the light source 210 (FIGS. 2 and 3) can transmit a pulse of light 214 that illuminates a first surface 252 of an object 250. As a result, some light from the light pulse 214 can disperse from a first surface 252 and be directed along an optical path that is substantially parallel to the path of a direct scattered light 216.

At block 608, the process 600 detects, at a detector (e.g., detector 230), scattered light from the illuminated surface of the object. That is, the detector 230 can detect the pulse of scattered light 216 that was dispersed from the first surface 252 and directed to the light detector 230. The light detector 230 can include a photo sensor 232, an aperture mask 234, and converging lens 236 to assist in gathering more pulses of scattered light (e.g., pulse of scattered light 238). In particular, the converging lens 236 gathers and directs pulses of scattered light (e.g., pulse of scattered light 238) toward a focal region at the photo sensor 232. In some instances, the pulses of scattered light (e.g., pulse of scattered light 238) include an encoded pulse of scattered light 238 originating from the light pulse 214, echo-scattered light 218 originating from the dispersed light pulse 214 echoing off one or more surfaces, and different pulse of light scattered 318 originating from a different pulse of light 314. In some examples, the photo sensor 232 is a photodiode such as an avalanche photodiode. In some examples, the detector is a photomultiplier tube. In some examples, detecting scattered light includes converting the detected pulse of scattered light 238 to a digital electrical signal.

At block 610, the process 600 correlates the detected pulse of scattered light with the sequence code that outputs a peak value associated with a time that the pulse of light is received. For example, the correlator 246 receives the sequence code from the signal generator 244 and the converted digital electrical signal from the A/D converter 238 of the detector 230. The correlator 246 then correlates the converted digital electrical signal with the sequence code. The correlation yields a peak value 418 (e.g., peak 418 FIG. 4B) situated at time index 0, which facilies synchronizing with time/clock 242 to determine the difference in time.

At block 612, the process 600 determines whether an amplitude of the at least one peak value exceeds a threshold value. For example, the microprocessor 240 can be configure to determine whether an amplitude of the peak value 418 from the correlation between the scattered light 216 and the sequence code exceeds a threshold value 418. For instance, the microprocessor would determine that the peak 118 depicted in FIG. 4B exceeds the threshold value 420, whereas the peaks of the remaining correlations do not exceed the threshold value 420. In some examples, the threshold value is at least one standard deviation above an average of the output from the correlator. For example, the microprocessor 240 can average and the standard deviation of the output of the correlator 246 and then set the threshold value to at the average plus the standard deviation. In some examples, the microprocessor makes the determination after the output of the correlator from one transceiving cycle is recorded.

At block 614, in accordance with a determination that the amplitude of the peak exceeds the threshold value, the process 600 determines a time difference between a time that pulse of light was transmitted and the time the pulse of light is received. For example, the time/clock 242 can pair a pulse of light 214 with a scattered pulse of light 216 and determine the time difference. In some examples, the time/clock 242 uses time markers (e.g., timestamps). In some instances, firing the pulse of light 214 can trigger a time marker and the correlation at time index zero can trigger a time marker.

At block 616, the process 600 calculates a distance to the surface of the object based on the time difference. For example, the microprocessor 240 can multiple the time difference by the speed of light divided by 2 to yield the distance to an object 250. For instance, with a time difference of 0.8 microseconds the microprocessor 240 would calculate the distance to an object 250 to be around 120 meters away (e.g., 0.8e–6*2.9979e8/2). After calculating the distance, the calculator module 310 can store the values to computer-readable medium/memory 248.

Figure 7A:
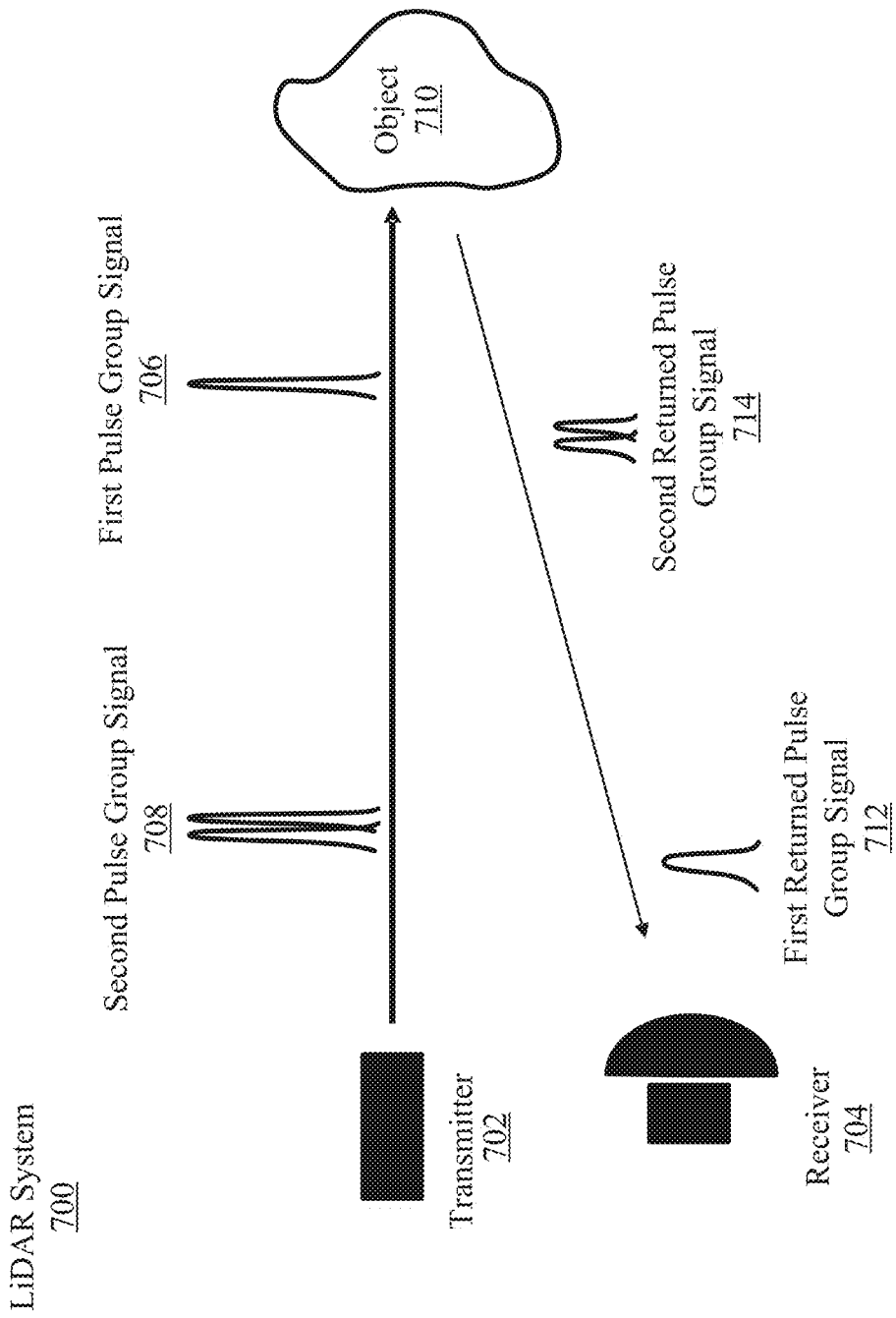
FIG. 7A illustrates an exemplary LiDAR system for correlating returned scattered lights with transmitted pulse signals, according to some embodiments of the disclosure.

At optional block 618, in accordance with a determination that the amplitude of the peak exceeds the threshold value, the process 600 determines a reflectivity of the surface of the object based on the amplitude of the peak. For example, a pulse of light 214 illuminates a surface (e.g., first surface 252) of an object 250, in which the light disperses and some of the scattered light 218 is directed to the detector 230. For highly reflective surfaces a large portion (e.g., percentage) of scattered light 218 is directed to the detector 230, whereas for low reflective surface a large portion (e.g., percentage) of scattered light 218 is directed to the detector 230. Because the amplitude of the correlation peak 418 decreases with attenuation (FIG. 5B) and the attenuation is proportional to the reflectivity of a surface, it is contemplated that the microprocessor 240 can be configured to determine a reflectivity of the surface (e.g., first surface 252) of the object 250 based on the amplitude of the peak value 418. FIG. 7A illustrates an exemplary LiDAR system for correlating returned scattered lights with transmitted pulse signals, according to some embodiments of the disclosure. In the depicted example, a LiDAR system 700 includes a transmitter 702 and a receiver 704. The transmitter 702 transmits, using a light source, a first pulse group signal 706 and a second pulse group signal 708 at two different times. A pulse group signal can include a group of one or more pulses that are spaced apart by relatively small time intervals. Thus, a pulse group signal can have one or more peaks. In the depicted example, the first pulse group signal 706 includes a single pulse and thus one peak, while the second pulse group signal 708 includes two pulses and thus two peaks. In the depicted example, the pulse signal of the first pulse group signal 706 and the pulse signals of the second pulse group signal 708 are associated with a same wavelength. In some examples, the pulse group signals 706 and 708 differ in other characteristics, such as pulse width, pulse shape, and/or the pulse repetition period within a pulse group.

The first pulse group signal 706 and the second pulse group signal 708 are separated by a time interval. The time interval is set large enough such that the two group signals do not overlap with each other. As depicted, the time interval between the transmission of pulse group signals 706 and 708 is larger than the time interval between the two pulses within the pulse group signal 708. This improves the likelihood that the scattered lights from the pulse group signals 706 and 708 are recognized as two distinct group signals. Further, it should be appreciated that, in some examples, it is desirable to set the time intervals among pulses within a pulse group signal as small as possible as long as the system can still discern the number of peaks in the group after it has been scattered. This further helps the scattered lights from multiple group signals to recognized as multiple distinct (e.g., not overlapping) pulse group signals after being scattered.

The receiver 704 receives, using the light detector, a first returned pulse group signal 712 and a second returned pulse group signal 714. For each returned pulse group signal, the system makes a determination as to which transmitted pulse group signal it corresponds to. For example, the system identifies two pulses (or peaks) within the second returned pulse group signal 714 and thus determines that the second returned pulse group signal 714 corresponds to the second pulse group signal 708. Accordingly, the system determines a distance based on the time when the pulse group signal 708 is transmitted and the time when the pulse group signal 714 is received.

Further, the system identifies one pulse (or peak) within the first returned pulse group signal 712 and thus determines that the first returned pulse group signal 712 corresponds to the first pulse group signal 706. Accordingly, the system determines a distance based on the time when the pulse group signal 706 is transmitted and the time when the pulse group signal 712 is received.

It should be appreciated that the LiDAR system 700 can correlate returned pulse group signals 712 and 714 to the respective transmitted signals regardless of the order in which the returned pulse group signals 712 and 714 are received. For example, if the first pulse group signal 706 is scattered by a relatively faraway object while the second pulse group signal 708 is scattered by a relatively nearby object, the returned pulse group signal 714 (corresponding to the second pulse group signal 708) may be received before the returned pulse group signal 712. Nevertheless, the system can still correctly correlate the returned pulse group signal 714 with the later transmitted pulse group signal 708 based on the number of peaks identified in the returned pulse group signal 714.

The above-described method of distinguishing scattered light originated from the same source improves the resolution of the LiDAR system. In a conventional system that cannot correctly correlate the scattered lights that are received in an order different from the order their corresponding light pulses were transmitted, the system may need to ensure that the scattered lights arrive in the same order, for example, by transmitting a signal and then waiting for the maximum time it takes for a light pulse to travel round trip to the farthest distance the LiDAR is designed for before transmitting the next signal. Using the above-described method, the system does not need to wait for the maximum time of flight between transmitting two consecutive signals. For example, the time between transmitting the first pulse group signal 706 and transmitting the second pulse group signal 708 can be less than the round trip time of flight for a light pulse to reach the farthest of the objects per the design specification of the system. Thus, the system is able to transmit pulse signals at a higher frequency, thus yielding higher resolution in the field of view without reducing the range of detection.

Figure 7B:
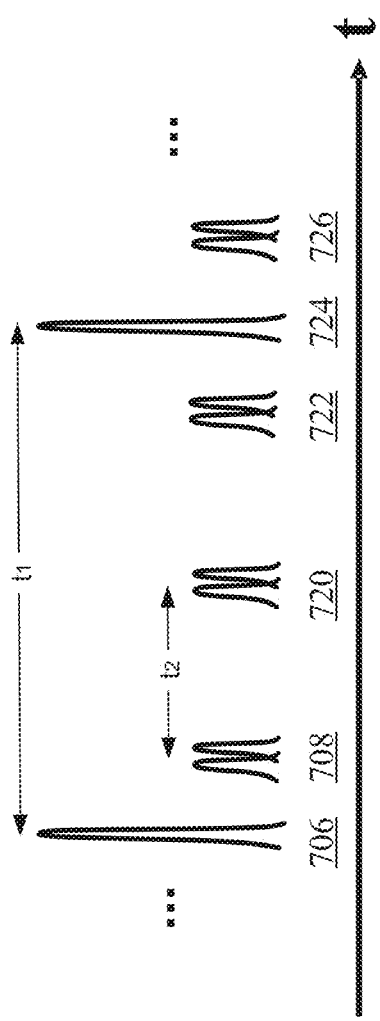
FIG. 7B illustrates an exemplary set of pulse signals transmitted by a LiDAR system, according to some embodiments of the disclosure.

FIG. 7B illustrates an exemplary set of pulse signals transmitted by a LiDAR system, according to some embodiments of the disclosure. As depicted, the set of pulse signals includes a first plurality of pulse group signals including the pulse group signals 706 and 724, as well as a second plurality of pulse group signals including the pulse group signals 708, 720, 722, and 726.

In some embodiments, the first plurality of pulse group signals are for detecting relatively faraway objects, while the second plurality of pulse group signals are for detecting relative nearby objects. Such a system eliminates the need of having electronics for multiple seed lasers in order to increase the density of the detected points without reducing the LiDAR system's range of detection. As depicted, the first plurality of pulse group signals (e.g., 706, 724) is of a higher amplitude than the second plurality of pulse group signals (e.g., 708, 720, 722, 726). The higher amplitude of signals 706 and 724 allows those signals to be used to range objects farther away. Further, the signals 706 and 724 of the first plurality are separated by a time interval $t_1$. In some examples, the time interval $t_1$ may be the maximum time it takes for a light pulse to travel round trip to the farthest distance the LiDAR system is designed for; as such, the system can distinguish among the signals of the first plurality using the "first to arrive" approach. Further, the signals 708 and 720 of the second plurality are separated by a time interval $t_2$. The system can distinguish between the scattered lights corresponding to signals of the first plurality and the scattered lights corresponding to signals of the second plurality based on the respective number of peaks in each scattered light, in accordance with the method described above.

In some examples, each pulse group signal of the first plurality is separated from the neighboring pulse group signal by the same time interval $t_1$ and each pulse group signal of the second plurality is separated from the neighboring pulse group signal by the same time interval $t_2$. The ratio between $t_1$ and $t_2$ is configured such that none of the first plurality of pulse group signals overlaps with any of the second plurality of pulse group signals.

While FIG. 7B illustrates distinguishing scattered lights originated from the same source, it should be appreciated that the method can be used to distinguish among pulses of light from different sources. For example, a first LiDAR system can be configured to transmit the first plurality of pulse group signals including 706 and 724 while a second LiDAR system can be configured to transmit the second plurality of pulse group signals including 708, 720, 722, and 726. For each scattered light, the first LiDAR system can identify the number of pulses (and/or peaks) within the scattered light and determine whether the scattered light originates from the first or the second LiDAR system.

Exemplary methods, non-transitory computer-readable storage media, systems, and electronic devices are set out in the following items:

1. A light detection and ranging (LiDAR) scanning system, comprising:
    a light source, wherein the light source is configured to transmit a pulse of light to illuminate a surface of an object;
    a modulator operable to encode the pulse of light with a sequence code in response to a signal from a sequence generator;
    a light detector configured to detect a pulse of scattered light from the surface of the object originating from the light pulse;
    a correlator electrically coupled to the light detector, wherein the correlator is configured to correlate the pulse of scattered light with the sequence code and output a peak value associated with a time that the pulse of scattered light is received, and
    a microprocessor electrically coupled to the light source and the correlator, wherein the microprocessor is configured to:
        determine whether an amplitude of the peak value exceeds a threshold value;
        in accordance with a determination that the amplitude of the peak exceeds the threshold value:
            determine a time difference between a time that pulse of light was transmitted and the time that the pulse of light is received; and
            calculate a distance to the surface of the object based on the time difference.

2. The LiDAR scanning system of item 1, wherein the light source is a laser diode light source.
3. The LiDAR scanning system of item 2, wherein the modulator is configured to modulate an injection current to the laser diode in accordance with on-off keying.
4. The LiDAR scanning system of any of items 1-3, wherein modulator is an opto-electrical modulator situated in the optical path of the pulse of light.
5. The LiDAR scanning system of any of items 1-4, wherein modulator is a Mach-Zehnder modulator situated in the optical path of the pulse of light.
6. The LiDAR scanning system of any of items 1-5, wherein the detector is a photodiode.
7. The LiDAR scanning system of any of items 1-6, wherein the detector is a photomultiplier tube.
8. The LiDAR scanning system of any of items 1-7, wherein the detector further comprises an analog to digital converter configured to convert the detected pulse of scattered light to an electrical digital signal.
9. The LiDAR scanning system of any of items 1-8, wherein the correlator is a module embedded within the microprocessor.
10. The LiDAR scanning system of any of items 1-9, wherein the correlator is an optical modulator configured to implement four-wave-mixing.
11. The LiDAR scanning system of any of items 1-10, wherein the sequence generator is a module embedded within the microprocessor.
12. The LiDAR scanning system of any of items 1-11, wherein the sequence code is a pseudorandom bit sequence code.
13. The LiDAR scanning system of item 12, wherein the pseudorandom bit sequence code is PRBS-5.
14. The LiDAR scanning system of any of items 1-13, wherein the threshold value is at least one standard deviation above an average of the output from the correlator.
15. The LiDAR scanning system of any of items 1-14, wherein in accordance with a determination that the amplitude of the peak exceeds the threshold value, the microprocessor is further configured to determine a reflectivity of the surface of the object based on the amplitude of the peak value.
16. A method for light detection and ranging (LiDAR) scanning detection, the method comprising:
    encoding a pulse of light from a light source with a sequence code;
    transmitting the pulse of light to illuminate a surface of an object;
    detecting, at a detector, a pulse of scattered light from the illuminated surface of the object;
    correlating the detected pulse of scattered light with the sequence code that outputs a peak value associated with a time that the pulse of scattered light is received;
    determining whether an amplitude of the peak value exceeds a threshold value;
    in accordance with a determination that the amplitude of the peak exceeds the threshold value:
        determining a time difference between a time that pulse of light was transmitted and the time the pulse of scattered light is received; and
        calculating a distance to the surface of the object based on the time difference.
17. The method of item 16, wherein in accordance with a determination that the amplitude of the peak exceeds the threshold value further comprises determining a reflectivity of the surface of the object based on the amplitude of the peak.

18. The method of any of items 16-17, wherein the light source is a laser diode.

19. The method of items 16-18 wherein encoding a pulse of light comprises modulating an injection current to the laser diode in accordance with on/off keying.

20. The method of any of items 16-19, wherein encoding a pulse of light comprises modulating the pulse of light in optical domain via an electro-optical modulator situated in the optical path of the pulse of light.

21. The method of any of items 16-20, wherein encoding a pulse of light comprises modulating the pulse of light via a Mach-Zehnder modulator situated in the optical path of the pulse of light.

22. The method of any of items 16-21, wherein the detector is a photodiode.

23. The method of any of items 16-22, wherein the detector is a photomultiplier tube.

24. The method of any of items 16-23, wherein detecting the pulse of scattered light comprises converting the detected pulse of scattered light to an electrical digital signal.

25. The method of any of items 16-24, wherein the sequence code is a pseudorandom bit sequence code.

26. The method of item 18, wherein the pseudorandom bit sequence code is PRBS-5.

27. The method of any of items 16-26, wherein the threshold value is at least one standard deviation above an average of the output from the correlator.

28. The method of any of items 16-27, wherein in accordance with a determination that the amplitude of the peak value exceeds the threshold value, determining a reflectivity of the surface of the object based on the amplitude of the peak value.

29. A computer-implemented method, comprising: in a light detection and ranging (LiDAR) system having a light source and a light detector:
   transmitting, using the light source, a first pulse group signal having a first number of pulse signals and a second pulse group signal having a second number of pulse signals, wherein the first number is different from the second number;
   receiving, using the light detector, a returned pulse group signal having a third number of pulse signals;
   determining, based on the third number of pulse signals, whether the returned pulse group signal corresponds to the first pulse group signal or the second pulse group signal;
      in accordance with a determination that the returned pulse group signal corresponds to the first pulse group signal, determining a first distance based on the returned pulse group signal and the transmitted first pulse group signal; and
      in accordance with a determination that the returned pulse group signal corresponds to the second pulse group signal, determining a second distance based on the returned pulse group signal and the transmitted second pulse group signal.

30. The method of item 29, wherein the first number is one.

31. The method of any of items 29-30, wherein the pulse signals of the first pulse group signal and the pulse signals of the second pulse group signal are associated with a same wavelength.

32. The method of any of items 29-31, wherein the time between transmitting the first pulse group signal and transmitting the second pulse group signal is less than the round trip time of flight for a light pulse to reach the farthest of the objects per the design specification of the system.

33. The method of any of items 29-32, further comprising:
   transmitting a first plurality of pulse group signals including the first pulse group signal, wherein each pulse group signal of the first plurality is separated from a neighboring pulse group signal of the first plurality by a first time interval;
   transmitting a second plurality of pulse group signals including the second pulse group signal, wherein each pulse group signal of the second plurality is separated from a neighboring pulse group signal of the second plurality by a second time interval, and wherein the first time interval is different from the second time interval.

34. The method of item 33, wherein the pulse group signals of the first plurality are associated with a first amplitude, and wherein the pulse group signals of the second plurality are associated with a second amplitude different from the first amplitude.

35. A light detection and ranging (LiDAR) scanning system, comprising:
   a light source, wherein the light source is configured to transmit a first pulse group signal having a first number of pulse signals and a second pulse group signal having a second number of pulse signals, wherein the first number is different from the second number;
   a light detector configured to detect a returned pulse group signal having a third number of pulse signals;
   a microprocessor electrically coupled to the light source and the light detector, wherein the microprocessor is configured to determine, based on the third number of pulse signals, whether the returned pulse group signal corresponds to the first pulse group signal or the second pulse group signal;
      in accordance with a determination that the returned pulse group signal corresponds to the first pulse group signal, determine a first distance based on the returned pulse group signal and the transmitted first pulse group signal; and
      in accordance with a determination that the returned pulse group signal corresponds to the second pulse group signal, determine a second distance based on the returned pulse group signal and the transmitted second pulse group signal.

It is understood that the specific order or hierarchy of blocks in the processes and/or flowcharts disclosed is an illustration of exemplary approaches. Based upon design preferences, it is understood that the specific order or hierarchy of blocks in the processes and/or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C § 112(f) unless the element is expressly recited using the phrase "means for.

What is claimed is:

1. A method, comprising:
   transmitting, with a light source, a pulse group signal, wherein the pulse group signal comprises a plurality of pulses having a characteristic;
   receiving a returned pulse group signal, wherein the returned pulse group signal corresponds to the transmitted pulse group signal scattered from a surface;
   correlating the returned pulse group signal with the transmitted pulse group signal based on the characteristic;
   determining a time difference between (1) a time associated with the transmitted pulse group signal and (2) a time associated with the returned pulse group signal;
   calculating a distance from the light source to the surface based on the time difference; and
   determining a reflectivity of the surface based on a correlation of the characteristic of the pulse group signal with the characteristic of the returned pulse group signal wherein the characteristic includes an amplitude of a correlation peak.

2. The method of claim 1, wherein the characteristic is a number of pulses in the transmitted pulse group signal.

3. The method of claim 1, wherein the characteristic is a pulse width of the pulse group signal.

4. The method of claim 1, wherein the characteristic is an amplitude of the pulse group signal.

5. The method of claim 1, wherein the characteristic is a pulse shape of the pulse group signal.

6. The method of claim 1, wherein the characteristic is a repetition period of the pulse group signal.

7. The method of claim 1, wherein the characteristic is a pulse position in a given timing slot of the pulse group signal.

8. The method of claim 1, wherein the characteristic is a frequency of each pulse.

9. The method of claim 1, wherein the transmitted pulse group signal is a first pulse group signal, the method further comprising:
   transmitting a second pulse group signal, wherein the second pulse group signal comprises a second plurality of pulses having a second characteristic;
   receiving a second returned pulse group signal, wherein the returned pulse group signal corresponds to the second pulse group signal scattered from a second surface;
   correlating the second returned pulse group signal with the second pulse group signal based on the second characteristic;
   determining a second time difference between (1) a time associated with the second pulse group signal and (2) a time associated with the second returned pulse group signal;
   calculating a second distance from the light source to the second surface based on the second time difference; and
   determining a reflectivity of the second surface based on a correlation of the second characteristic of the second pulse group signal with the characteristic of the second returned pulse group signal.

10. The method of claim 9, wherein a time between (1) the time associated with the first pulse group signal and (2) the time associated with the second pulse group signal is less than a round trip time of flight for a light pulse to reach a farthest object per design of the light source.

11. The method of claim 9, wherein:
    the second pulse group signal is transmitted after the first pulse group signal, and the first returned pulse group signal is correlated with the first pulse group signal regardless of when the first returned pulse group signal is received relative to receipt of the second returned pulse group signal.

12. The method of claim 1, further comprising transmitting a first plurality of pulse group signals, wherein:
    the first pulse group signal is part of the first plurality of pulse group signals, and
    each pulse group signal of the plurality of the pulse group signals is transmitted periodically at a first time interval.

13. The method of claim 12, further comprising transmitting a second plurality of pulse group signals, wherein:
    each of the second plurality of the second pulse group signals is transmitted periodically at a second time interval.

14. The method of claim 13, wherein a ratio between the first time interval and the second time interval is configured such that none of the first plurality of the first pulse group signal overlaps with any of the second plurality of pulses.

15. The method of claim 13, wherein the second time interval is smaller than the first time interval.

16. The method of claim 1, wherein the light source is placed on a vehicle.

17. A light detection and ranging (LiDAR) scanning system, comprising:
    a light source, wherein the light source is configured to transmit a pulse group signal, wherein the pulse group signal comprises a plurality of pulses having a characteristic;
    a light detector configured to receive a returned pulse group signal, wherein the returned pulse group signal corresponds to the transmitted pulse group signal scattered from a surface; and a microprocessor electrically coupled to the light source and the light detector, wherein the microprocessor is configured to:
correlate the returned pulse group signal with the transmitted pulse group signal based on the characteristic;
determine a time difference between (1) a time associated with the transmitted pulse group signal and (2) a time associated with the returned pulse group signal;
calculate a distance from the light source to the surface based on the time difference; and
determine a reflectivity of the surface based on a correlation of the characteristic of the pulse group signal with the characteristic of the returned pulse group signal wherein the characteristic includes an amplitude of a correlation peak.

18. The system of claim 17, wherein the characteristic is a number of pulses in the transmitted pulse group signal.

19. The system of claim 17, wherein the characteristic is a frequency of each pulse.

20. The system of claim 17, wherein the light source is placed on a vehicle.

\* \* \* \* \*